US012674685B2

(12) United States Patent
Salehi et al.

(10) Patent No.: US 12,674,685 B2
(45) Date of Patent: Jul. 7, 2026

(54) SYSTEM AND METHOD OF ACTOR-BASED MAP ATTRIBUTE GENERATION

(71) Applicant: GM Global Technology Operations LLC, Detroit, MI (US)

(72) Inventors: Rasoul Salehi, Ann Arbor, MI (US); Brent Navin Roger Bacchus, Sterling Heights, MI (US); Michael Alan Losh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 58 days.

(21) Appl. No.: 18/651,824

(22) Filed: May 1, 2024

(65) Prior Publication Data

US 2025/0341405 A1      Nov. 6, 2025

(51) Int. Cl.
*G01C 21/00* (2006.01)

(52) U.S. Cl.
CPC ....... *G01C 21/387* (2020.08); *G01C 21/3815* (2020.08); *G01C 21/3833* (2020.08); *G01C 21/3896* (2020.08)

(58) Field of Classification Search
None
See application file for complete search history.

(56) References Cited

U.S. PATENT DOCUMENTS

| | | | | |
|---|---|---|---|---|
| 12,195,038 B1 * | 1/2025 | Leibs | ................. | B60W 60/001 |
| 2011/0202271 A1 * | 8/2011 | Kruithof | ............ | G01C 21/3844 |
| | | | | 701/533 |
| 2018/0188037 A1 * | 7/2018 | Wheeler | .............. | G06V 20/582 |
| 2020/0025935 A1 * | 1/2020 | Liang | ...................... | G06V 20/64 |
| 2020/0278217 A1 * | 9/2020 | Ahmad | ................... | G01C 21/16 |
| 2021/0354708 A1 * | 11/2021 | Gyllenhammar | ....... | H04W 4/46 |
| 2021/0373566 A1 * | 12/2021 | Agarwal | ......... | B60W 30/18145 |
| 2022/0250646 A1 * | 8/2022 | Kobilarov | .......... | B60W 60/0011 |

(Continued)

FOREIGN PATENT DOCUMENTS

| | | | |
|---|---|---|---|
| DE | 102017211607 A1 | 1/2019 | |
| DE | 102017215708 A1 * | 3/2019 | .......... B60W 60/001 |

(Continued)

OTHER PUBLICATIONS

Machine translation of DE-102017215708-A1 (Year: 2019).*
Zou, G.J., "Scene Creation System for an Autonomous Vehicle," U.S. Appl. No. 18/157,880, filed Jan. 23, 2023.

*Primary Examiner* — Anne Marie Antonucci
*Assistant Examiner* — Kyle S Park
(74) *Attorney, Agent, or Firm* — Honigman LLP; Matthew H. Szalach

(57) ABSTRACT

A system and method of actor-based map attribute generation and, more particularly, geometrical attribute and semantic attribute generation. A computer-implemented method that, when executed by data processing hardware, causes the data processing hardware to perform operations comprising gathering sensor data via a sensor system of a host vehicle, processing perception data via a perception system of the host vehicle, maintaining onboard map data of the host vehicle, determining a position of the host vehicle, evaluating the sensor data, the perception data, and the onboard map data via an online mapping module, and fusing one or more detected map attributes with existing map attributes.

17 Claims, 17 Drawing Sheets

(56)                        References Cited

U.S. PATENT DOCUMENTS

2022/0348224  A1 *  11/2022  Zhao ..................... B60W 40/02
2024/0142265  A1 *   5/2024  Grewe ............... G01C 21/3848
2024/0419902  A1 *  12/2024  Wu ........................ G06F 40/30
2025/0003764  A1 *   1/2025  Pullagurla ............. B60W 40/06
2025/0171020  A1 *   5/2025  Chandra Shekar . B60W 60/001

FOREIGN PATENT DOCUMENTS

DE         102020102725  A1      9/2020
WO      WO-2022098511  A2      5/2022

* cited by examiner

330 ⌐

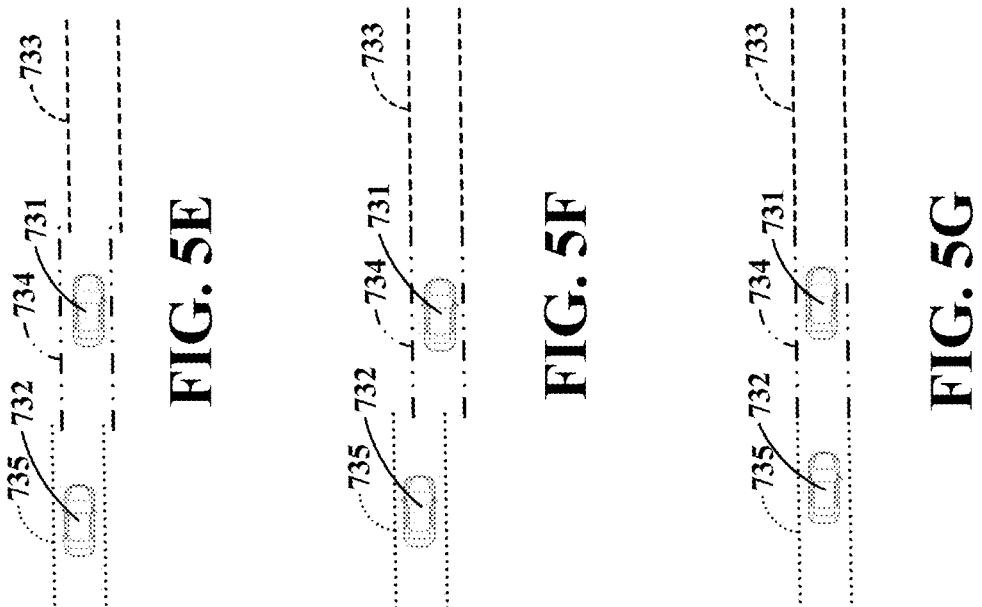
FIG. 5E
FIG. 5F
FIG. 5G
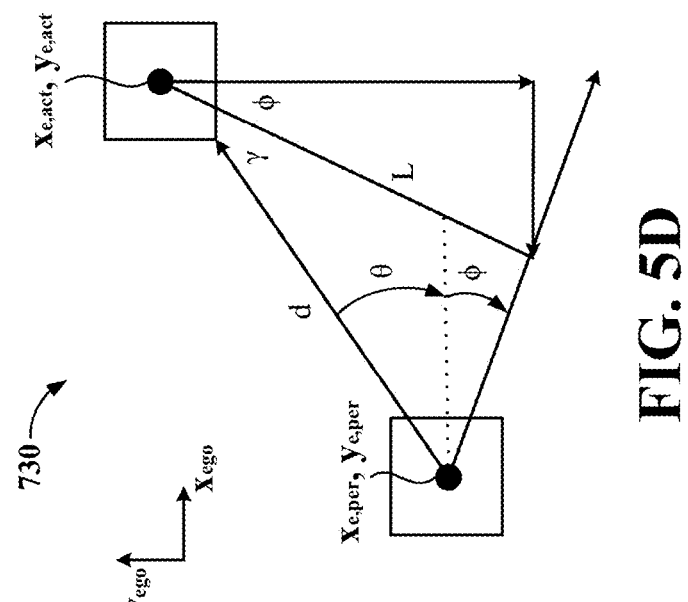
FIG. 5D

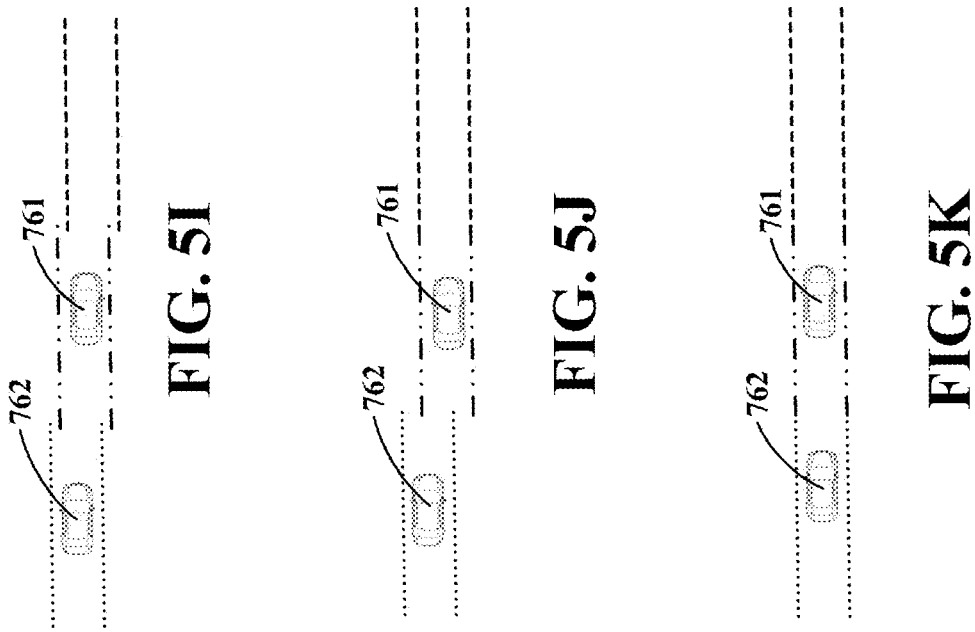
FIG. 5I
FIG. 5J
FIG. 5K
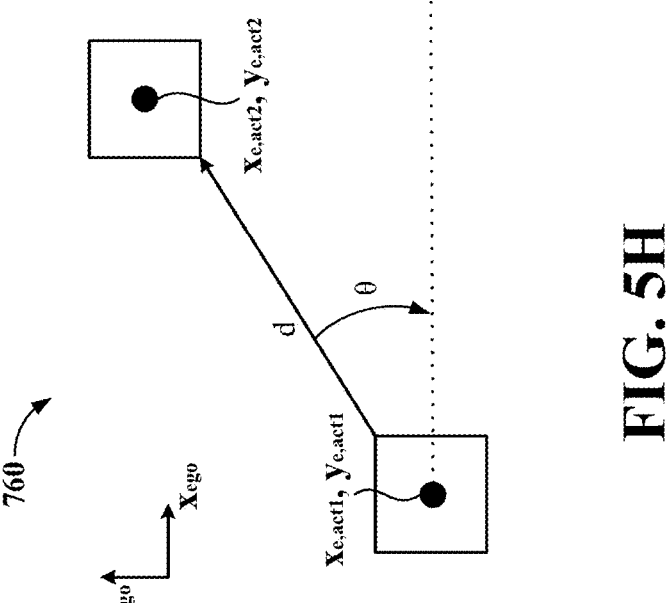
FIG. 5H

SYSTEM AND METHOD OF ACTOR-BASED MAP ATTRIBUTE GENERATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to onboard and off-board maps of vehicles, and more particularly, extracting road features to maintain onboard and off-board maps for autonomous driving vehicles.

In general, autonomous vehicles rely on map data to generate a future path of travel. The map data can include inaccuracies and/or limitations due to a number of factors. For example, adverse weather can cause blurriness, sensors may be blocked, or changes to a road network since the map data was gathered. Gathering one or more attributes of the road and updating the map data with the same may be desirable to enhance the data relied on by autonomous vehicles. The present disclosure addresses one or more shortcomings of existing systems and methods of gathering and updating map data for partially and/or fully autonomous vehicles.

SUMMARY

In one configuration, a computer-implemented method that, when executed by data processing hardware, causes the data processing hardware to perform operations is provided. The operations include gathering sensor data via a sensor system of a host vehicle, processing perception data via a perception system of the host vehicle, maintaining onboard map data of the host vehicle, determining a position of the host vehicle, evaluating the sensor data, the perception data, and the onboard map data via an online mapping module, and fusing one or more detected map attributes with existing map attributes.

Implementations of the disclosure may include one or more of the following optional features. For example, the method may further include updating the onboard map data with the one or more detected map attributes. The method may further include determining quality of existing map attributes based on the one or more detected map attributes. The method may further include communicating the one or more detected map attributes to a cloud database for use by other vehicles.

According to at least one aspect, the online mapping module may further include an actor-based reasoner module and an online map generator module. The one or more detected map attributes can be semantic road attributes. The semantic road attributes can determined based on perceived data of one or more road actors.

According to another aspect, the one or more detected map attributes may be geometrical road attributes. The geometrical road attributes may be inferred based on perceived data of one or more road actors.

According to at least one example, fusing the one or more detected map attributes with the existing map attributes can further include providing high definition map data that is configured for a planning module of the host vehicle.

In another configuration, a system is provided and includes data processing hardware and memory hardware in communication with the data processing hardware, the memory hardware storing instructions that, when executed on the data processing hardware, cause the data processing hardware to perform operations. The operations include gathering sensor data via a sensor system of a host vehicle, processing perception data via a perception system of the host vehicle, maintaining onboard map data of the host vehicle, determining a position of the host vehicle, evaluating the sensor data, the perception data, and the onboard map data via an online mapping module, and fusing one or more detected map attributes with existing map attributes.

Implementations of the disclosure may include one or more of the following optional features. For example, the method can further include updating the onboard map data with the one or more detected map attributes. The method can further include determining quality of existing map attributes based on the one or more detected map attributes. The method can further include communicating the one or more detected map attributes to a cloud database for use by other vehicles.

According to at least one aspect, the one or more detected map attributes can be either semantic road attributes or geometrical road attributes.

In yet another configuration, a vehicle management system is provided and includes a sensor system, a perception system, an onboard map module, an online mapping module comprising an actor-based reasoner module and an online map generator module, data processing hardware, and memory hardware in communication with the data processing hardware. The memory hardware storing instructions that, when executed on the data processing hardware, cause the data processing hardware to perform operations. The operations include gathering sensor data via a sensor system of a host vehicle, processing perception data via a perception system of the host vehicle, maintaining onboard map data of the host vehicle, determining a position of the host vehicle, evaluating the sensor data, the perception data, and the onboard map data via an online mapping module, and fusing one or more detected map attributes with existing map attributes.

Implementations of the disclosure may include one or more of the following optional features. For example, the method can further include updating the onboard map data with the one or more detected map attributes. The method can further include determining quality of existing map attributes based on the one or more detected map attributes. The method can further include communicating the one or more detected map attributes to a cloud database for use by other vehicles.

According to at least one aspect, the one or more detected map attributes can be either semantic road attributes or geometrical road attributes.

BRIEF DESCRIPTION OF THE DRAWINGS

The drawings described herein are for illustrative purposes only of selected configurations and are not intended to limit the scope of the present disclosure.

FIG. 5D is a plot showing position of a road actor with respect to a perceived lane edge point;

FIG. 5E is a schematic showing initial lane inference could be miss-aligned due to actors miss-alignment on a road according to principles of the present disclosure;

FIG. 5F is a schematic showing actor-to-perception alignment according to principles of the present disclosure;

FIG. 5G is a schematic showing actor-to-actor alignment according to principles of the present disclosure;

FIG. 5H is a plot showing position of a road actor with respect to another road actor;

FIG. 5I is a schematic showing initial lane inference could be miss-aligned due to actors miss-alignment on a road according to principles of the present disclosure;

FIG. 5J is a schematic showing actor-to-perception alignment according to principles of the present disclosure;

FIG. 5K is a schematic showing actor-to-actor alignment according to principles of the present disclosure;

Corresponding reference numerals indicate corresponding parts throughout the drawings.

DETAILED DESCRIPTION

Figure 1:
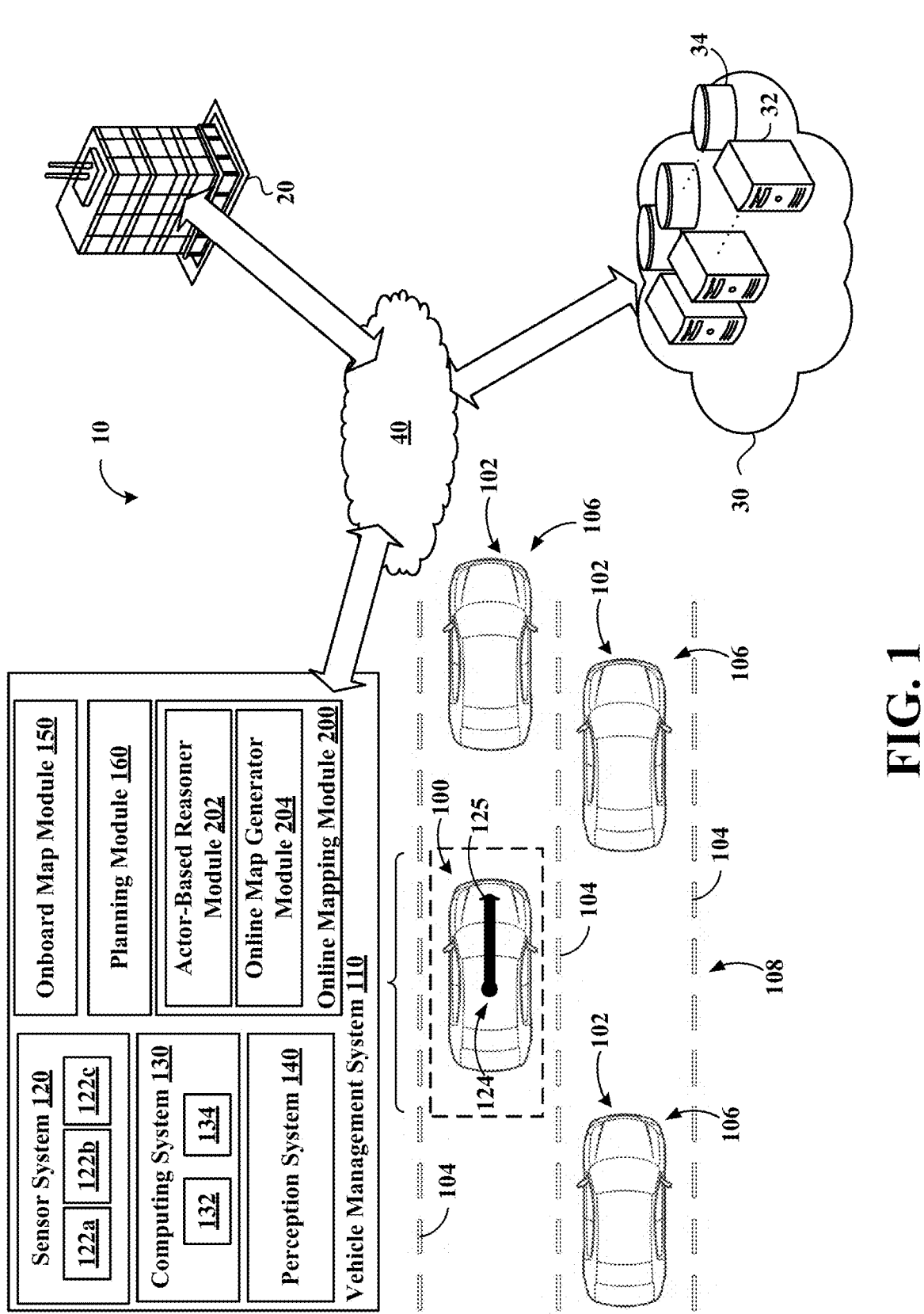
FIG. 1 is a schematic diagram of a vehicle environment including a vehicle and a vehicle management system of the vehicle according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle 100 which may also be referred to as a host vehicle or an ego vehicle throughout the description of the present disclosure. The vehicle 100 may be an autonomous vehicle and may be any type of vehicle such as, a sedan, truck, sport utility vehicle, van, or motor home. The vehicle 100 may be fully autonomous including an automated driving system (ADS) for performing all driving tasks or a semi-autonomous vehicle including an advanced driver assistance system (ADAS) for assisting a driver with steering, braking, and/or accelerating. The vehicle environment 10 can include one or more non-host vehicles or actors 102. The one or more actors 102 may be fully autonomous, partially autonomous, or non-autonomous vehicles and may be equipped with the same or different hardware as the host vehicle 100.

The vehicle environment 10 includes one or more scene, road, or geometrical attributes 104 (i.e., lane lines, lane markings, curbs, etc.) and/or one or more semantic attributes 106 on a road 108. As will be discussed in more detail below, the one or more geometrical attributes 104 or the one or more semantic attributes 106 may be missing or are outdated at scenes with occlusion, short field of view (FOV), work zones, etc.

The vehicle environment 10 also includes a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 40 (e.g., the Internet, cellular networks).

The vehicle 100 includes a vehicle management system 110 including a sensor system 120, a computer system 130, a perception system 140, an onboard map module 150, a planner module 160, and an online mapping module 200. While the vehicle 100 maneuvers about the environment 10, the sensor system 120 includes various sensor subsystems 122, 122a-122c configured to gather sensor data 123, 123a-123c relating to characteristics of the environment 10 and/or a status of the vehicle 100. For instance, the sensor subsystems 122 include a vehicle exterior sensor subsystem 122a configured to measure or obtain external environmental data 123a, such as lane markings or surrounding objects (e.g., vehicles, pedestrians), an interior sensor subsystem 122b configured to measure interior environmental data 123b, such as vehicle occupancy, and/or a vehicle status sensor subsystem 122c configured to measure or obtain vehicle operating data 123c, such as vehicle location and operating parameters such as wheel speed and/or lateral acceleration. The exterior sensor subsystem 122a and the interior sensor subsystem 122b can include one or more of an RGB camera, an infrared camera, a thermal camera, a radar, and/or an external microphone. The vehicle status sensor subsystem 122c can include an inertial measurement unit (IMU), a global positioning system (GPS), one or more wheel speed sensors, as well as other sensors for obtaining vehicle operating data such as wheel speed, steering wheel position, yaw rate, and lateral acceleration. The vehicle status sensor subsystem 122c can continuously monitor a position 124 of the host vehicle 100 which may be defined as an x-position, y-position, and a heading. The position 124 of the host vehicle 100 can also be represented as motion or position vectors 125.

As the sensor system 120 gathers the sensor data 123, the computing system 130 is configured to store, process, and/or communicate the sensor data 123 within the vehicle operating environment 10. In order to perform computing tasks related to the sensor data 123, the computing system 130 of the vehicle 100 includes data processing hardware 132 and memory hardware 134. The data processing hardware 132 is configured to execute instructions stored in the memory hardware 134 to perform computing tasks related to operation and management of the vehicle 100.

The computing system 130 can refer to one or more locations of data processing hardware 132 and/or memory hardware 134. In some examples, the computing system 130 is a local system located on the vehicle 100. When located on the vehicle 100, the computing system 130 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 130 may allow processing to occur at an activity location while a centralized computing system 130 may allow for a central processing hub that communicates to systems located at various positions on the vehicle 100.

Additionally or alternatively, the computing system 130 includes computing resources that are located remotely from the vehicle 100. For instance, the computing system 130 may communicate via the network 40 with a remote vehicle computing system 30 (e.g., a remote computer/server or a cloud-based environment). Much like the computing system 130, the remote vehicle computing system 30 includes remote computing resources such as remote data processing hardware 32 and remote memory hardware 34. Here, sensor data 123 or other processed data (e.g., data processed locally by the computing system 130) may be stored in the remote vehicle computing system 30 and may be accessible to the computing system 130. In some examples, the computing system 130 is configured to utilize the remote resources 32, 34 as extensions of the computing resources 132, 134 such that resources of the computing system 130 may reside on resources of the remote vehicle computing system 30.

The perception system 140 can be configured to store and/or process the sensor data 123 and communicate perception data 143 within the vehicle operating environment 10. In one configuration, the perception system 140 is integrated in the computing system 130 or the remote computing system 30. In another configuration, the perception system 140 is a separate system from both the computing system 130 and the remote computing system 30.

During travel, the semantic attributes 106 such as maneuvers from other road actors 102 may be gathered and/or perceived for generating, monitoring, and/or maintaining an onboard and/or off-board map for the host vehicle 102. Additionally, the other road actors 102 may be used to infer geometrical attributes 104 such as, lanes and lane connectivity for the host vehicle 100. This may be particularly useful when the perception system 140 cannot detect geometrical attributes 104 due to occlusion or a short field of view, for example. In some instances, it is easier to detect the other road actors 102 on the road 108 rather than the actual geometrical attributes 104 (i.e., lanes and road markings) or the semantic attributes 106 (i.e., maneuvers) of the road 108.

The vehicle 10 can be equipped with the onboard map module 150 comprising an onboard map or onboard map data 153 which provides prior mapping information with high and/or low resolution road segments 155 of the road 108 to the online mapping module 200 of the host vehicle 100. Additionally or alternatively, the onboard map module 150 can include prior map semantic attributes 157 that can be provided to the online mapping module 200 of the host vehicle 100. The onboard map module 150 may be configured to be continuously updated in real time while the host vehicle 100 is traveling or is at rest.

Figure 2:
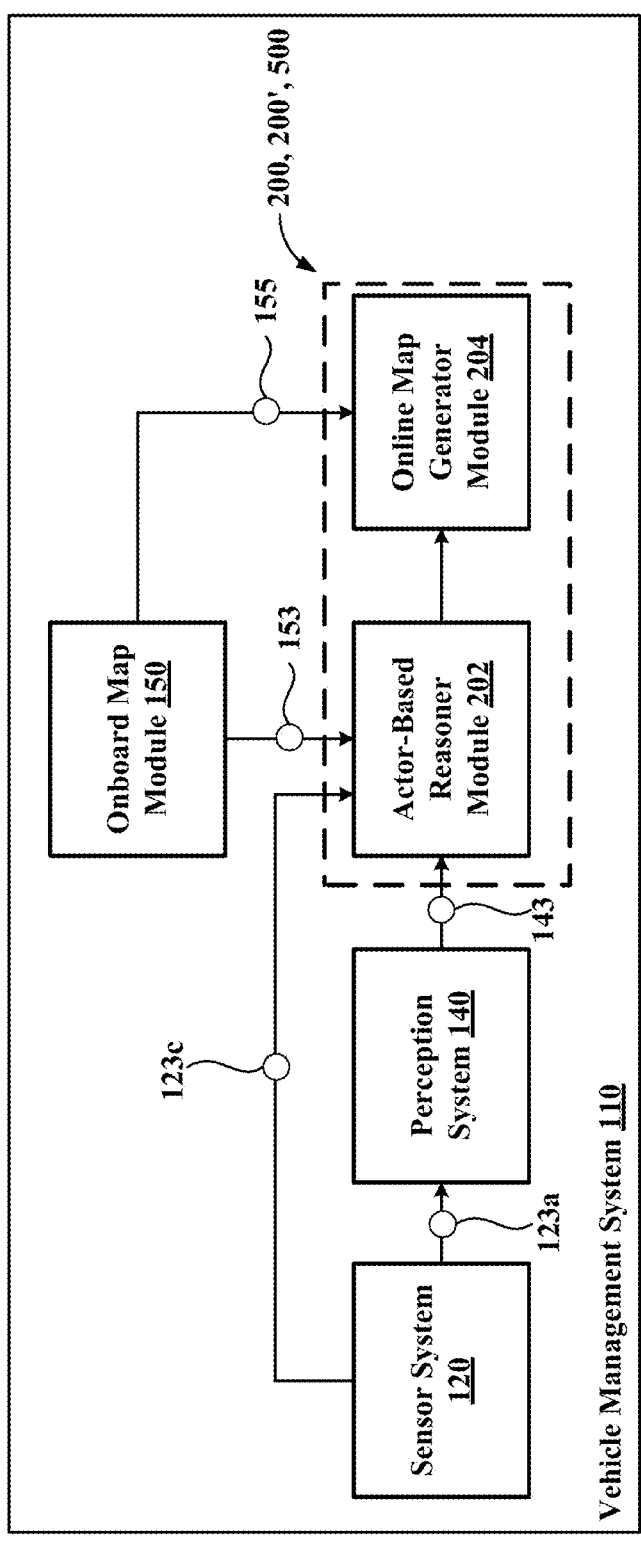
FIG. 2 is an enlarged schematic diagram showing an example vehicle management system comprising an online mapping module according to the principles of the present disclosure.

With continued reference to FIG. 2, the online mapping module 200 can include an actor-based reasoner module 202 and an online map generator module 204. The vehicle status sensor data 123c, the perception data 143, and the onboard map data 153 can be provided to the online mapping module 200 so that the semantic attributes 106 and/or the geometrical attributes 104 may be generated and utilized by the host vehicle 100. This will be discussed in more detail with respect to the following configurations and according to the principles of the present disclosure.

Figure 3A:
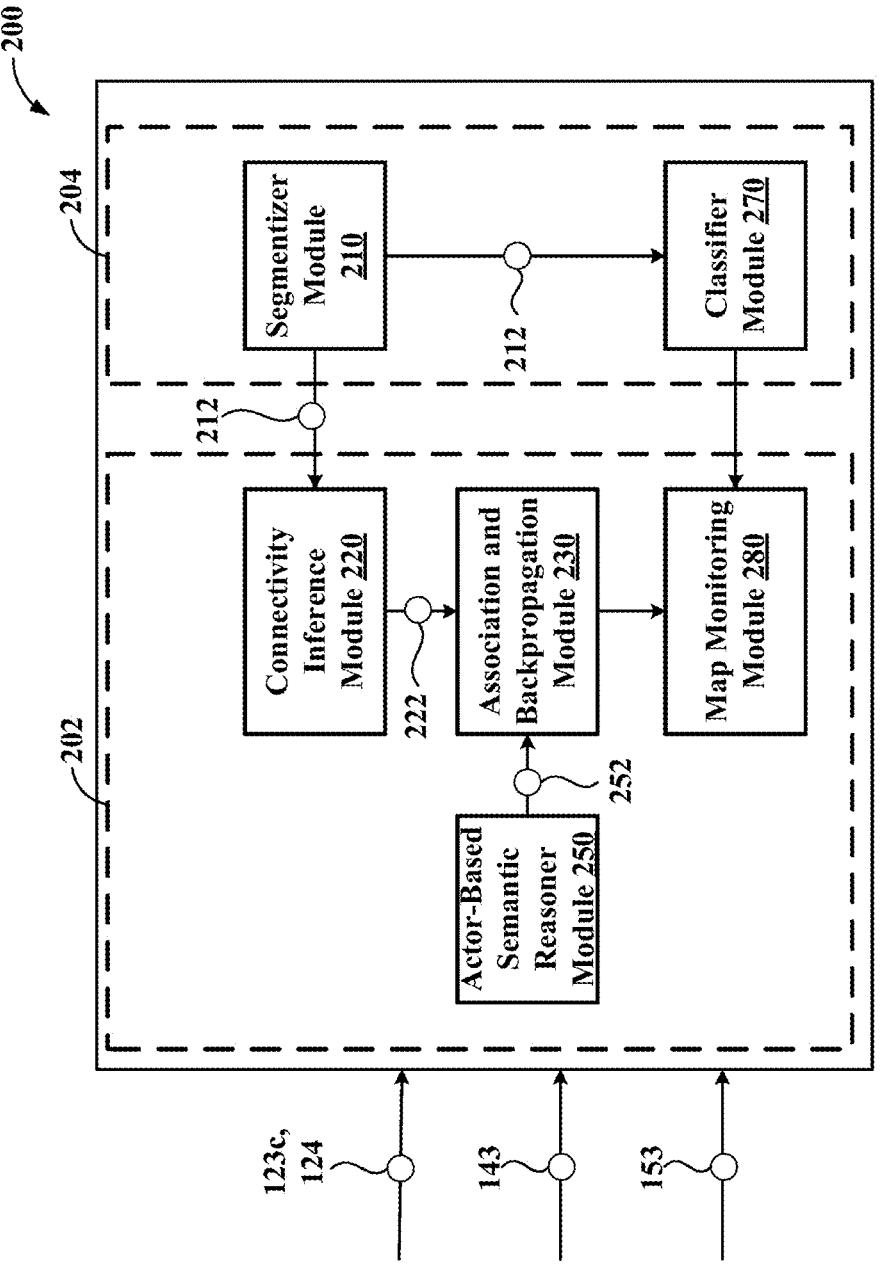
FIG. 3A is an enlarged schematic diagram showing a configuration of the online mapping module of FIG. 2.

In one configuration, with reference to FIG. 3A, the semantic attributes 106 can be monitored using road actor reasoning. In other words, traffic control devices and/or signs and road elements (lane lines, lane edges, etc.) are designed to create particular road actor 102 behavior and patterns and, thus, unusual behavior of the road actors 102 can indicate anomalies of the onboard map 153.

With continued reference to FIG. 3A, the vehicle status sensor data 123c, the perception data 143, and the onboard map data 153 is provided to the online mapping module 200. A segmentizer module 210 of the online map generator module 204 evaluates mapping data 153 and the position 124 of the host vehicle 100 and provides a connectivity graph 212 to a connectivity inference module 220 of the actor-based reasoner module 202. The connectivity inference module 220 evaluates the connectivity graph 212 and provides a connectivity sequence 222 to an association and backpropagation module 230 of the actor-based reasoner module 202. An actor-based semantic reasoner module 250 provides detected semantic attributes 252 to the association and backpropagation module 230 which can be configured to synchronize the detected semantic attributes 252 with the connectivity sequence 212. A classifier module 270 of the online map generator module 204 can also receive and evaluate the connectivity graph 212 from the segmentizer module 210. A map monitoring module 280 of the actor-based reasoner module 202 compares the semantic attributes 106 of the road 108 with the detected semantic attributes 252 of the actor-based semantic reasoner 250 to determine anomalies of the onboard map 153. The anomalies can be reported to a cloud system for onboard map data or can be used to assess quality of the prior onboard map data 153, for example.

Figure 4:
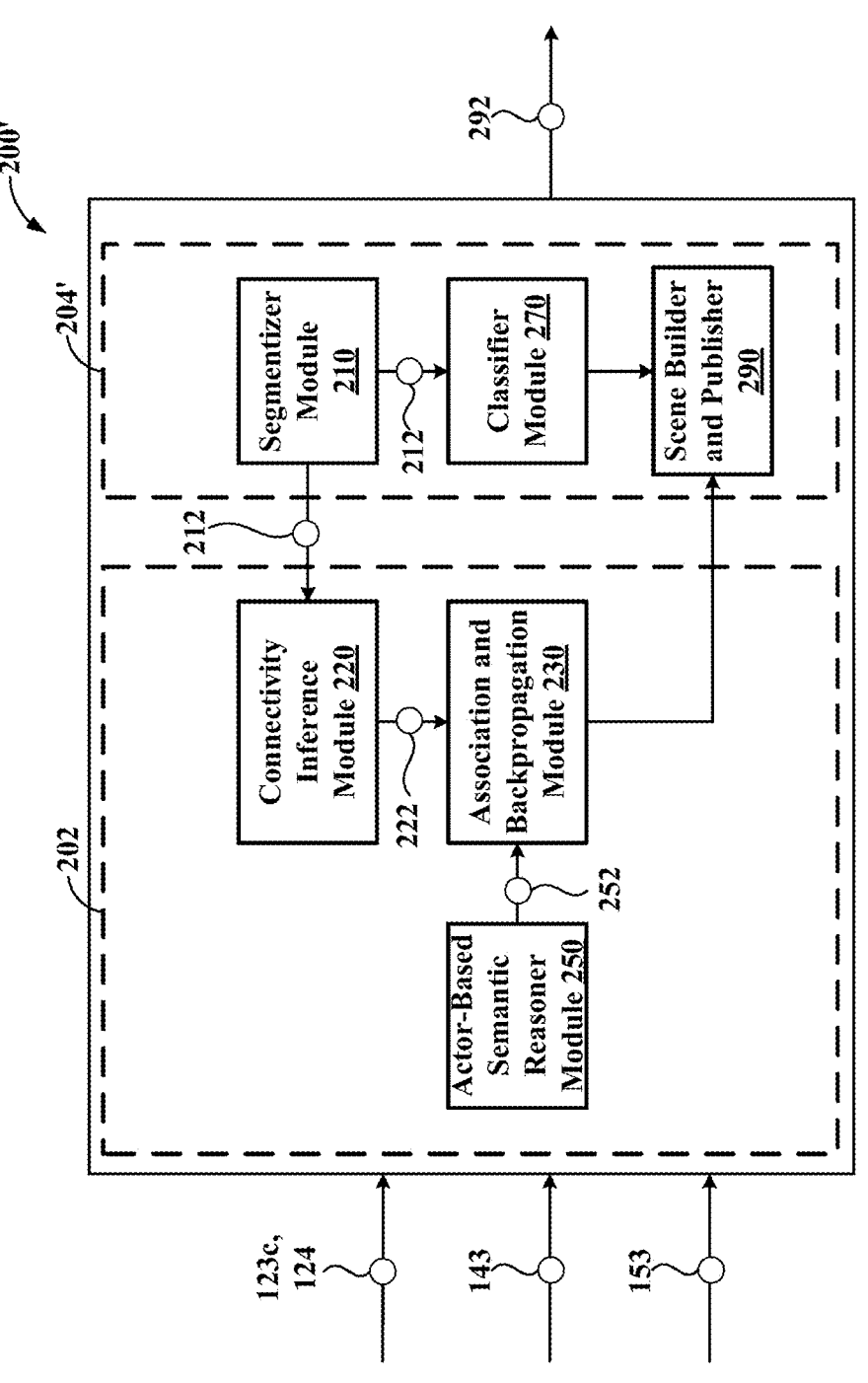
FIG. 4 is an enlarged schematic diagram showing another configuration of the online mapping module of FIG. 2.

In another configuration, with reference to FIG. 4, the online map generator module 204' can include a scene builder and publisher module 290. The scene builder and publisher module 290 may be configured to fuse the detected semantic attributes 252 with prior onboard map data 153 and generate a high definition (HD) type map 292. The HD type map 292 may be desirable as it provides the planner module 160 with additional or updated semantic road attributes 106 such that the planner module 160 can control the vehicle 100 with improved data in real time.

Figure 3C:
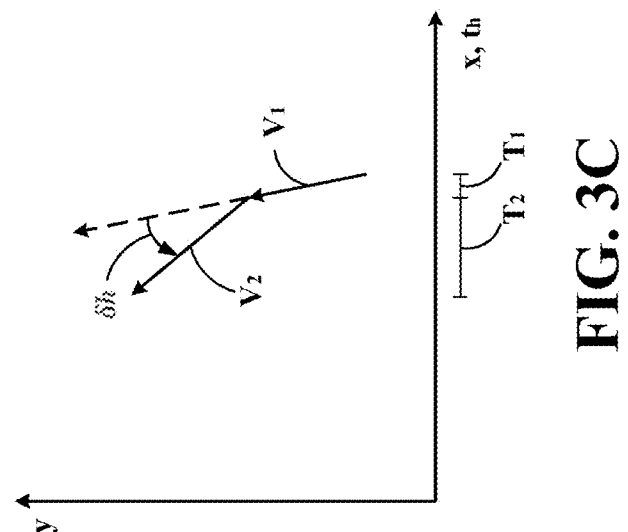
FIG. 3C is a plot showing position of the vehicle versus time according to the principles of the present disclosure.
Figure 3B:
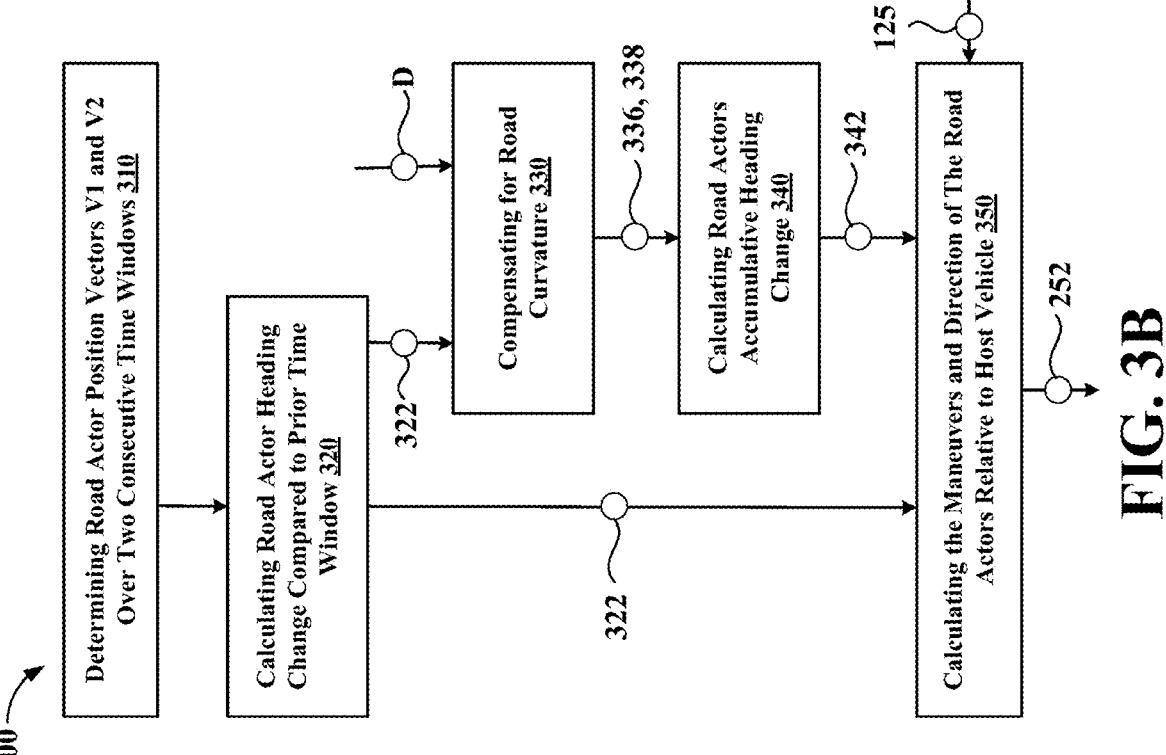
FIG. 3B is a flow diagram showing operations of the online mapping module of FIG. 3A.

With reference to FIG. 3B, a method 300 of evaluating the one or more road actors 102 and extracting the detected semantic attributes 252 is provided. The detected semantic attributes 252 can be estimated based on trajectories of one or more of the road actors 102. For instance, with reference to FIG. 3C, the trajectories may be represented as motion or position vectors V1, V2, for example.

At 310, the position vectors $V_1$, $V_2$ of the road actor 102 are determined over a consecutive time window such as, a first time window $T_1$ and a second time window $T_2$.

At 320, the road actor 102 heading change (δh) compared to the prior time window is calculated. The heading change (δh) can be calculated using equation (I):

$$\delta h = \mathrm{atan}(V_1, V_2) \tag{I}$$

Figure 3D:
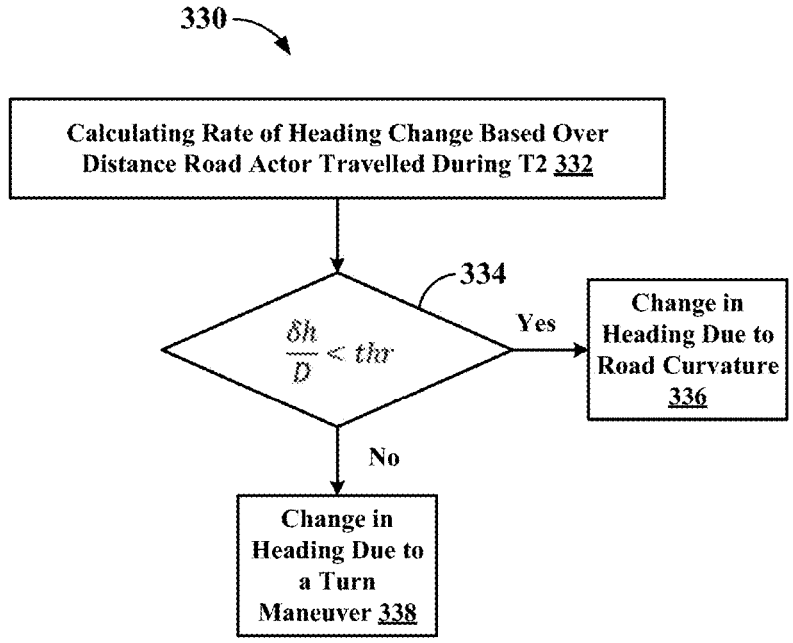
FIG. 3D is a detailed flow diagram of one step of the flow diagram of FIG. 3B.

At 330, heading change (δh) can be further evaluated so that road curvature, if any, is compensated for. With reference to FIG. 3D, compensating for road curvature at 332 includes calculating a rate of heading changed over a distance D the road actor 102 traveled during T2 which may be represented with equation (II):

$$\frac{\delta h}{D} \tag{II}$$

With continued reference to FIG. 3D, at 334, if the rate of heading changed over the distance D is evaluated and compared against a threshold value (thr), as shown in equation (III):

$$\frac{\delta h}{D} < thr \tag{III}$$

If the rate of heading changed over the distance D is less than the threshold value (thr), then the change in heading is due to road curvature at 336. The change in heading being due to road curvature may be represented by the following equation (IV):

$$\Delta H(k+1) = \Delta H(k) \tag{IV}$$

If the rate of heading changed over the distance D is greater than the threshold value (thr), then the change in heading is due to a turn maneuver at 338. The change in heading being due to the turn maneuver may be represented by the following equation (V):

$$\Delta H(K+1) = \Delta H(K) + \delta h \cdot dt_h \tag{V}$$

With reference again to FIG. 3B, at 340, an accumulative heading change 342, ΔH of the road actor 102 is calculated. The accumulative heading change 342, ΔH may be represented by equation (VI):

$$\Delta H = \int_0^T \delta h_{compensated} \cdot \delta t_h \tag{VI}$$

At 350, one or more of the semantic attributes 252 (i.e., maneuvers and direction) of the road actors 102 relative to the host vehicle 102 are calculated. The semantic attributes 252 of the road actors 102 may be calculated based on the accumulative heading change 342, the second position vector $V_2$ of the road actor 102, and a second position vector 125 of the host vehicle 100.

Figure 3E:
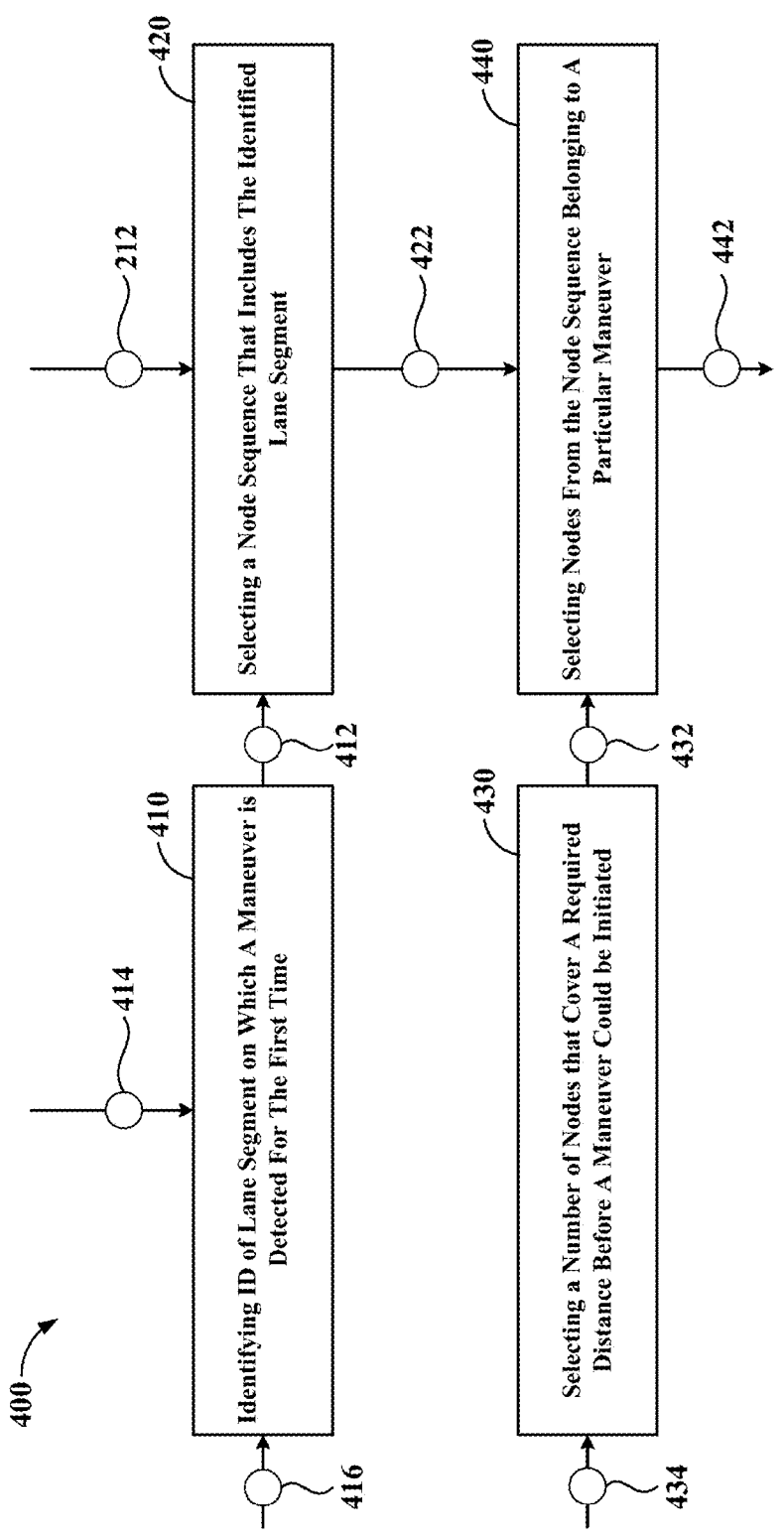
FIG. 3E is a flow diagram showing operations of the online mapping module of FIG. 3A.

With reference to FIG. 3E, a method 400 of maneuver backpropagation for detecting and assessing maneuvers of the road actors 102 during or after the maneuver is completed is provided. Maneuver backpropagation can be desirable because it can identify lane segments that a maneuver could be initiated from.

At 410, a lane segment 412 is identified for which a maneuver is detected for the first time. Boundaries 414 and a first location (x, y) 416 can be gathered to help identify the maneuver with respect to the lane segment 412.

At 420, a node sequence 422 is selected from the connectivity graph 212 that includes the lane segment 412 identified at 410.

At 430, a number of nodes 432 are selected that cover a required distance 434 before a maneuver could be initiated.

At 440, a final node sequence 442 is selected from the nodes 432 and the node sequence 422 that belongs to a particular maneuver.

Figure 5A:
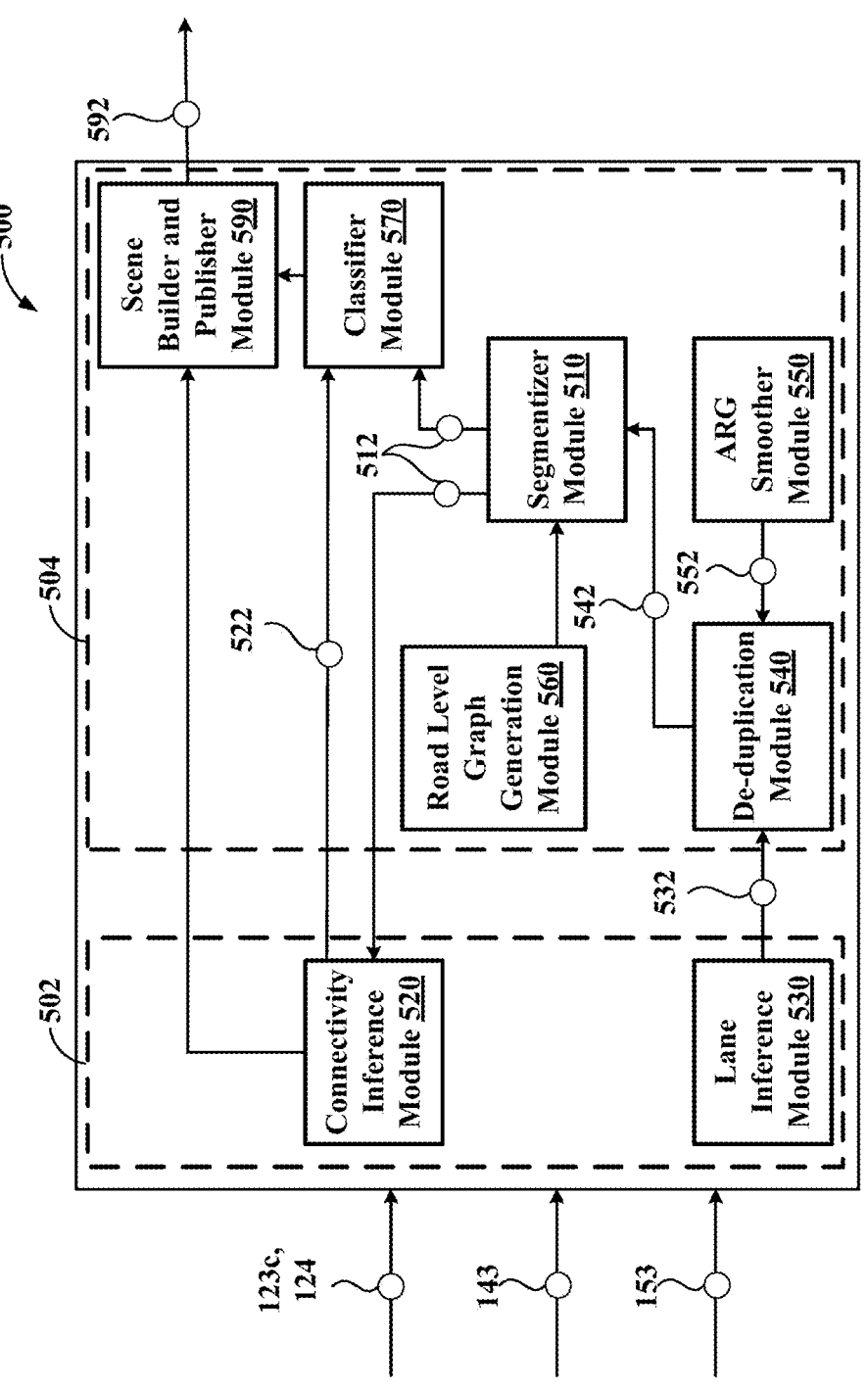
FIG. 5A is an enlarged schematic diagram showing another configuration of the online mapping module of FIG. 2.

FIG. 5A illustrates another illustrative configuration of an online mapping module 500. This configuration is similar in many respects to the configurations of FIGS. 3A-3E and FIG. 4. Accordingly, the descriptions of the configurations are hereby incorporated into one another, and description of subject matter common to the configurations generally may not be repeated.

In general, road actor information (i.e., the vehicle status sensor data 123c and the perception data 143) and the onboard map data 153 is gathered and provided to an actor-based reasoner module 502. The actor-based reasoner module 502 may be configured to infer geometric road attributes based on the road actor information. Any detected geometrical attributes can be provided to an online map generator module 504.

With reference to FIG. 5A, a lane inference module 530 evaluates the vehicle status sensor data 123c, the perception data 143, and the onboard map data 153 and provides detected lane segments 532 to a de-duplication module 540 of the online map generator module 504. An ARG smoother module 550 of the online map generator module 504 provides the de-duplication module 540 with perceived lane information 552 that can be compared and/or fused to actor-based lane edges. The de-duplication module 540 provides final lane segments 542 to a segmentizer module 510. A road level graph generation module 560 can provide the segmentizer module 510 with a graph of road connections based on prior known road topology. The segmentizer module 510 of the online map generator module 504 evaluates final lane segments 542 and provides a connectivity graph 512 to a connectivity interface module 520 and to a classifier module 570. According to at least one aspect, the segmentizer 510 can be configured to detect connectivity of segments by determining shared segments. The connectivity interface module 520 evaluates the connectivity graph 512 and provides connectivity sequences 522 to a scene builder and publisher module 590 of the online map generator module 504. The scene builder and publisher module 590 can provide a high resolution module 592 to the planner module 160 (FIG. 1) of the vehicle 100, for example.

Figure 5B:
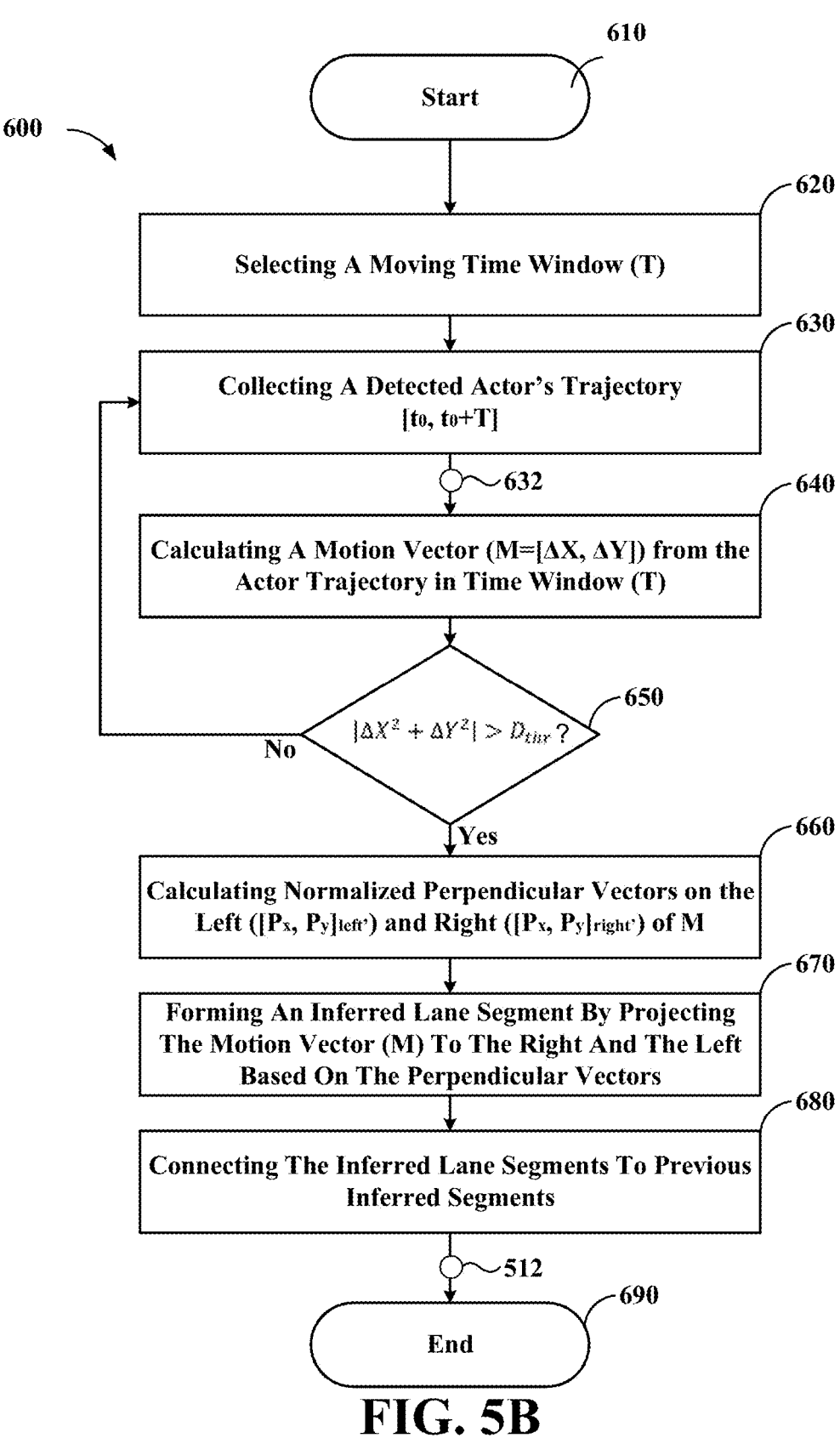
FIG. 5B is a flow diagram showing operations of the online mapping module of FIG. 5A.

With reference to FIG. 5B, the lane inference module 530 can generate lane segments over a selected time window according to a method 600.

At 610, the method 600 is initiated. In practical terms, the method 600 is initiated when an operator starts the ignition of the host vehicle 100.

At 620, a moving time window T is selected.

At 630, a trajectory 632 of one or more of the road actors 102 is collected.

At 640, a motion vector M=[ΔX, ΔY] is calculated based on the trajectory of the road actor 102 in the time window T.

At 650, it is determined whether the road actor has moved enough (i.e., more than a threshold $D_{thr}$) for the lane inference module 530 of the actor-based reasoner module 502. This can be represented by equation (VII):

$$|\Delta X^2 + \Delta Y^2| > D_{thr} \qquad \text{(VII)}$$

If the road actor has not exceeded the threshold $D_{thr}$, then the method 600 returns to 630 and $t_0=t_0+T$ At 660, normalized perpendicular vector on the left $[P_x, P_y]_{left}$, and the right $[P_x, P_y]_{right}$ of the motion vector M are calculated.

At 670, an inferred lane segment can be formed by projecting the motion vector M to the right and to the left based on the perpendicular vectors.

At 680, the inferred lane segments are connected to previous inferred segments to form the connectivity graph 512.

At 690, the method ends.

Figure 5C:
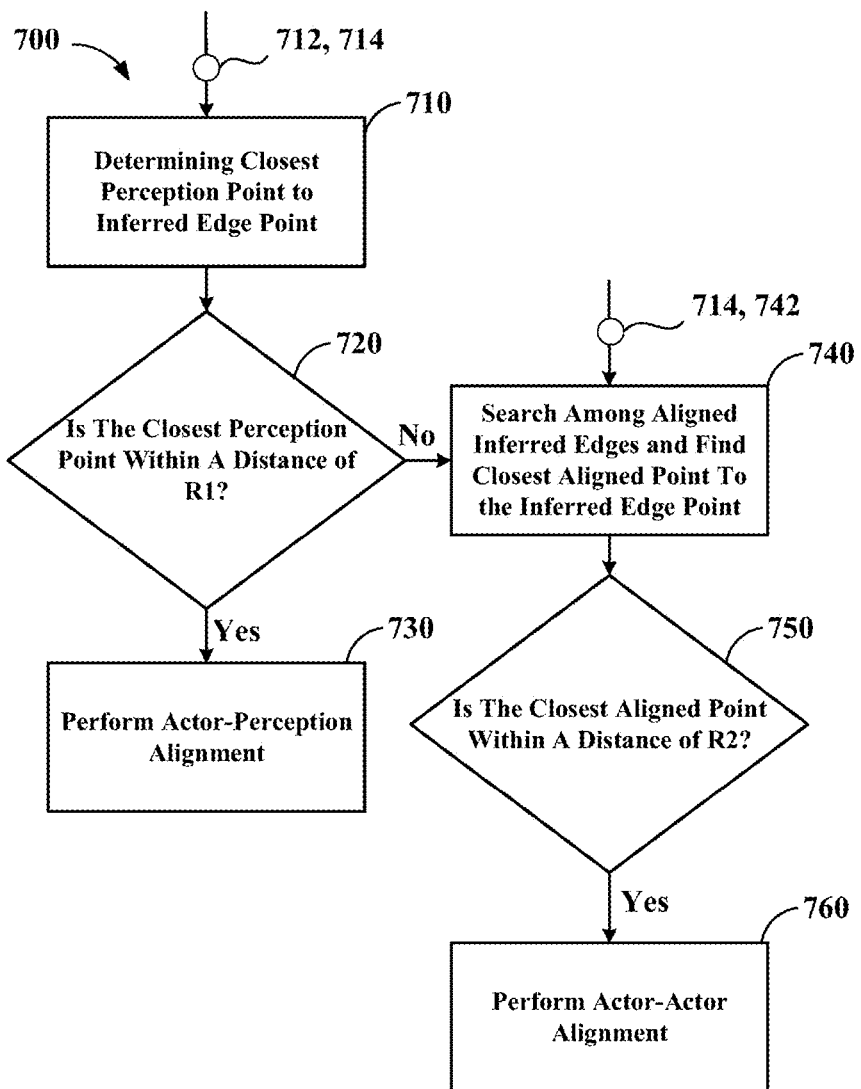
FIG. 5C is a flow diagram showing operations of the online mapping module of FIG. 5A.
Figure 5L:
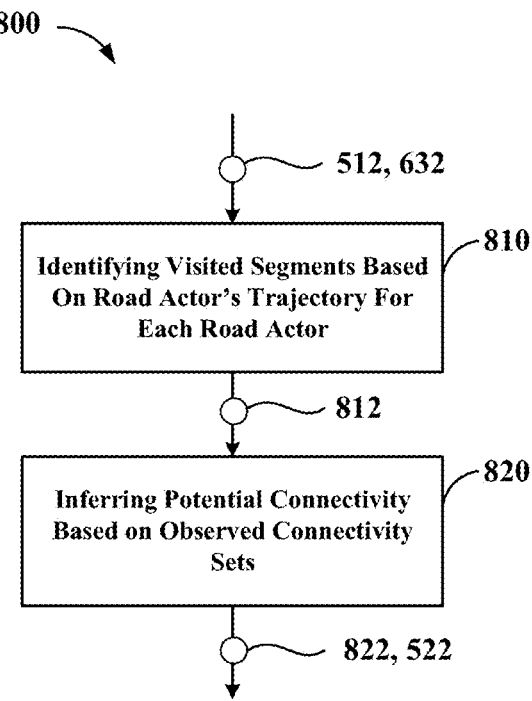
FIG. 5L is a flow diagram showing operations of the online mapping module of FIG. 5A.

With reference to FIG. 5C, the lane inference module 530 can cancel lane offset according to method 700.

At 710, a closest perception point 712 to an inferred edge point 714 can be determined.

At 720, the distance between the closest perception point 712 and the inferred edge point 714 is evaluated to determine whether the distance is less than or equal to a value R1.

At 730, if the distance is less than or equal to R1 then actor-perception alignment is performed to cancel lane offset. With reference to FIGS. 5D, Actor-Perception alignment can be represented by the following equations (VIII-XIII):

$$\theta = \operatorname{atan}\left(\frac{[y_{e,act} - y_{e,per}]}{[x_{e,act} - x_{e,per}]}\right) \qquad \text{(VIII)}$$

$$\alpha = \theta + \phi \qquad \text{(IX)}$$

$$\gamma = \frac{\pi}{2} - \alpha \qquad \text{(X)}$$

$$L = d * \cos(\gamma) \qquad \text{(XI)}$$

$$x_{e,act_{New}} = x_{e,act} - L * \sin(\phi) \qquad \text{(XII)}$$

$$y_{e,act_{New}} = y_{e,act} - L * \cos(\phi) \qquad \text{(XIII)}$$

With reference to FIGS. 5E-5G, positions of road actors 731, 732 are projected on perceived lane markings 733. Inferred lane edges 734 of a first road actor 731 can be aligned with perceived lane edges 733, as shown in FIG. 5F. Inferred lane edges 735 of a second road actor 734 can then be aligned with the inferred lane edges 734 of the first road actor 731 and the perceived lane edges 733, as shown in FIG. 5G.

With reference again to FIG. 5C, if, at 740, the distance is not less than or equal to R1, then inferred edges 714 are evaluated to find a closest aligned inferred point 742 to the inferred edge point 714.

At 750, the distance between the closest aligned point 742 and the inferred edge point 714 is evaluated to determine whether the distance is less than or equal to a value R2.

At 760, if the distance is less than or equal to R2 then Actor-Actor alignment is performed to cancel lane offset. With reference to FIG. 5D, Actor-Actor alignment can be represented by the following equations (XIV, XV, XVI):

$$\theta = \operatorname{atan}\left(\frac{[y_{e,act2} - y_{e,act1}]}{x_{e,act2} - x_{e,act1}}\right) \qquad \text{(XIV)}$$

$$x_{e,act2_{New}} = x_{e,act2} \qquad \text{(XV)}$$

$$y_{e,act2_{New}} = y_{e,act2} - d\sin(\theta) \qquad \text{(XVI)}$$

The calculated "New" values refer to coordinates of inferred points after alignment. With reference to FIGS. 5I-5K, actor to actor alignment and fusion for road actors 761, 762 that are not close to any perception edge is illustrated.

With reference to FIG. 5E, the connectivity inference module 520 can connect map elements so that they may be used to design a future path for the vehicle 100 according to method 800. Trajectories of the road actors 102 can be used for connecting inferred map elements and existing map elements.

At 810, visited segments of the connectivity graph 512 based on the trajectory 632 of the road actor 102 are identified for each of the roach actors 102.

At 820, the connectivity sequences 522 can include observed connectivity sequences 812 and inferred connectivity sequences 822. The observed connectivity sequences 812 may be used to provide the inferred connectivity sequences 822, for example. The connectivity sequences 522 may be desirable for providing a possible sequence that can be followed by the host vehicle 100.

Figures 6A, 6B:
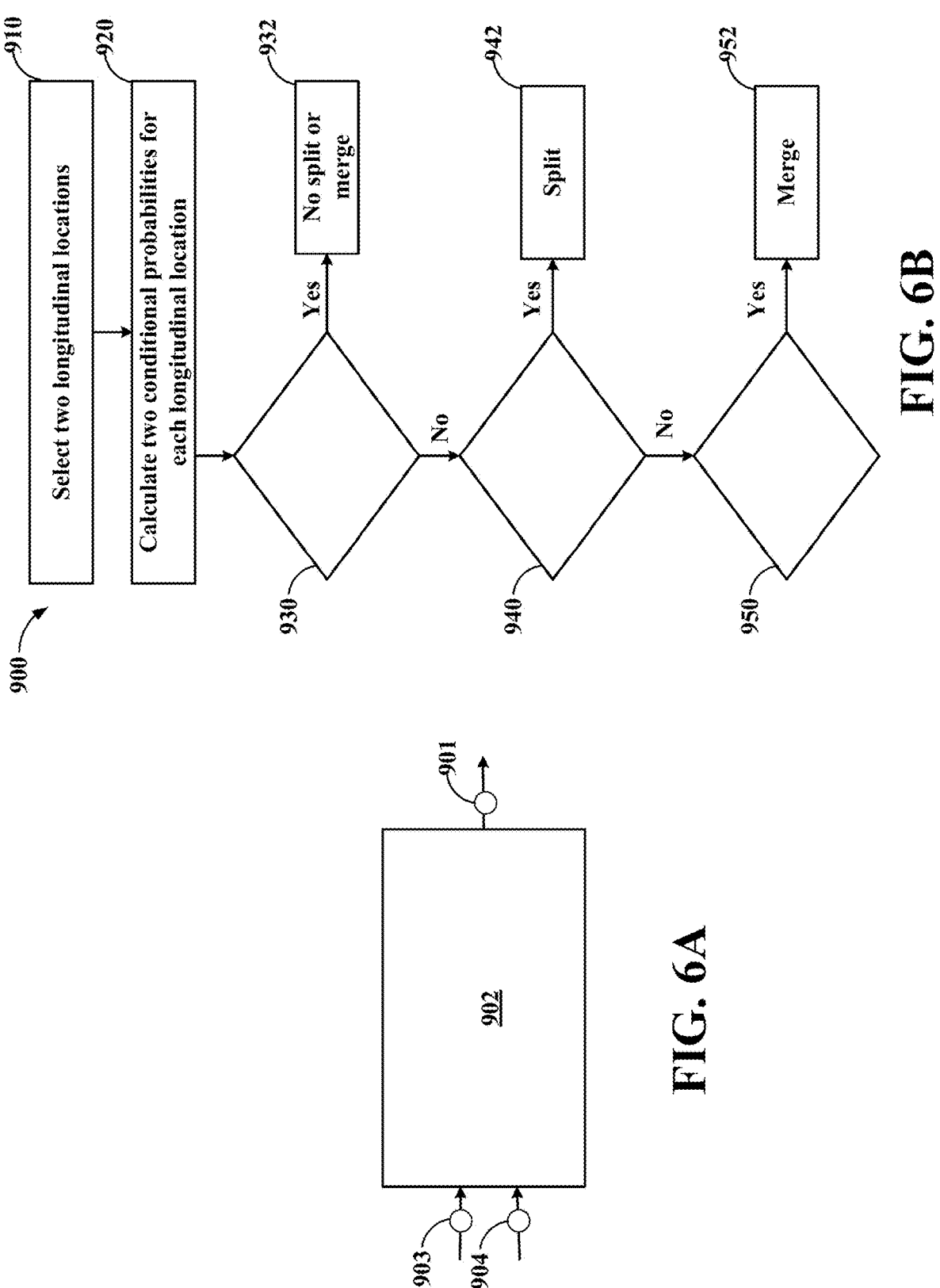
FIG. 6A is a schematic diagram showing an attribute detector according to principles of the present disclosure.
FIG. 6B is a flow diagram showing operations of the attribute detector of FIG. 6A according to one configuration.

With reference to FIG. 6A, another configuration for detecting geometrical attributes 901 is provided. An attribute detector 902 can be configured to receive one or more inputs, such as inferred lanes 903 and one or more road actor matrices 904. According to at least one aspect, the attribute detector 901 can be configured to utilize various techniques such as deep and/or shallow classifiers, a Bayesian inference engine or rule, etc. to detect attributes such as a lane split point, a lane merge point, or a road exit, for example.

With reference to 6B, a method 900 is provided for utilizing a Bayes classifier to detect lane merge.

At 910, two or more longitudinal locations can be selected.

At 920, two or more conditional probabilities can be calculated for the two or more longitudinal locations. For example, a probability ($H_1$) of an existence of a single lane and a probability of an existence of two or more lanes ($H_2$) given the actor feature vector 904 can be calculated using the following equation (XVII):

$$(P(H_i|F_1, F_2, \dots F_n) = \frac{P(F_1, \dots F_n|H_i) * P(H_i)}{P(F_1, F_2, \dots F_n)} = \tag{XVII}$$

$$\frac{\prod_{i=1}^{n} p(F_i|H_i) * P(H_i)}{P(F_1, F_2, \dots F_n)}$$

At 930, the conditional probabilities can be evaluated to determine whether following relationship in (XVIII) is true:

$$P(H_i)|_{Location1} \approx P(H_i)|_{Location2} \tag{XVIII}$$

If the relationship in (XVIII) is true then the method 900 proceeds to 932 and no split or merge exists. However, if the relationship in (XII) is false then the method proceeds to 940.

At 940, the conditional probabilities can be evaluated to determine whether the following relationship in (XIX) is true:

$$P(H_1)|_{Location1}, P(H_2)|_{Location2} > P_{thr} \tag{XIX}$$

If the relationship in (XIX) is true then the method 900 proceeds to 942 and a split exists (i.e., the first location has one lane and the second location has two lanes). However, if the relationship in (XIX) is false then the method proceeds to 950.

At 950, the conditional probabilities can be evaluated to determine whether the following relationship in (XX) is true:

$$P(H_2)|_{Location1}, P(H_1)|_{Location2} > P_{thr} \tag{XX}$$

If the relationship in (XX) is true then the method 900 proceeds to 952 and a merge exists (i.e., the first location has two lanes and the second location has one lane.

Figure 6D:
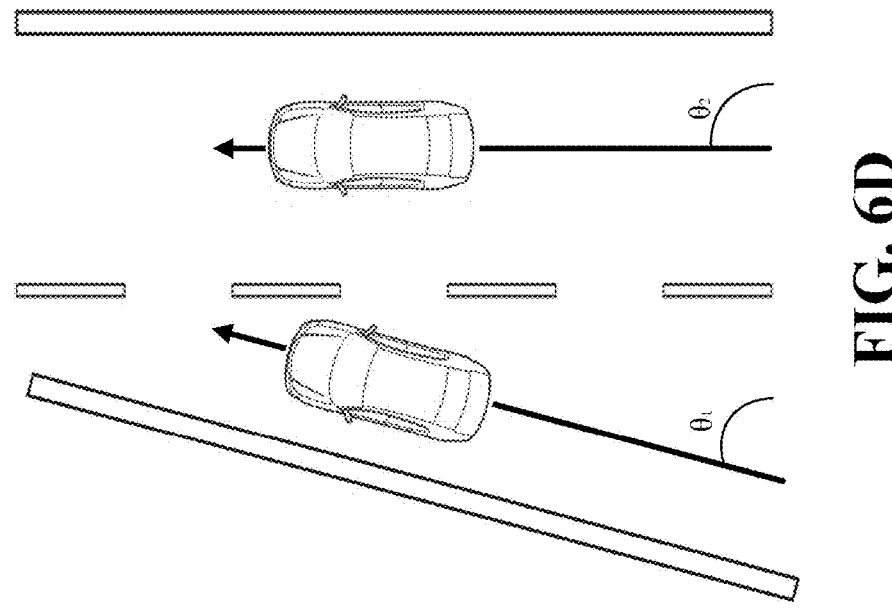
FIG. 6D is a schematic showing another driving scenario of the two road actors on the road.
Figure 6C:
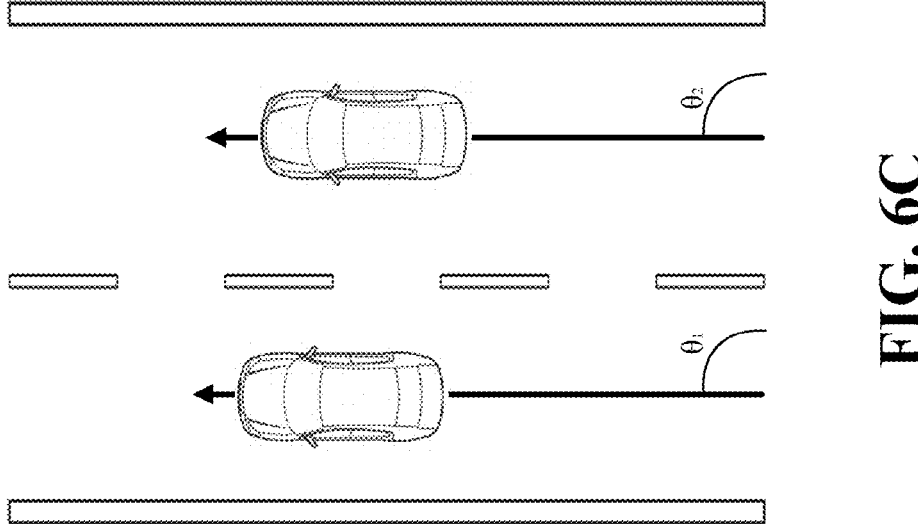
FIG. 6C is schematic showing a driving scenario of two road actors on a road.
Figure 6E:
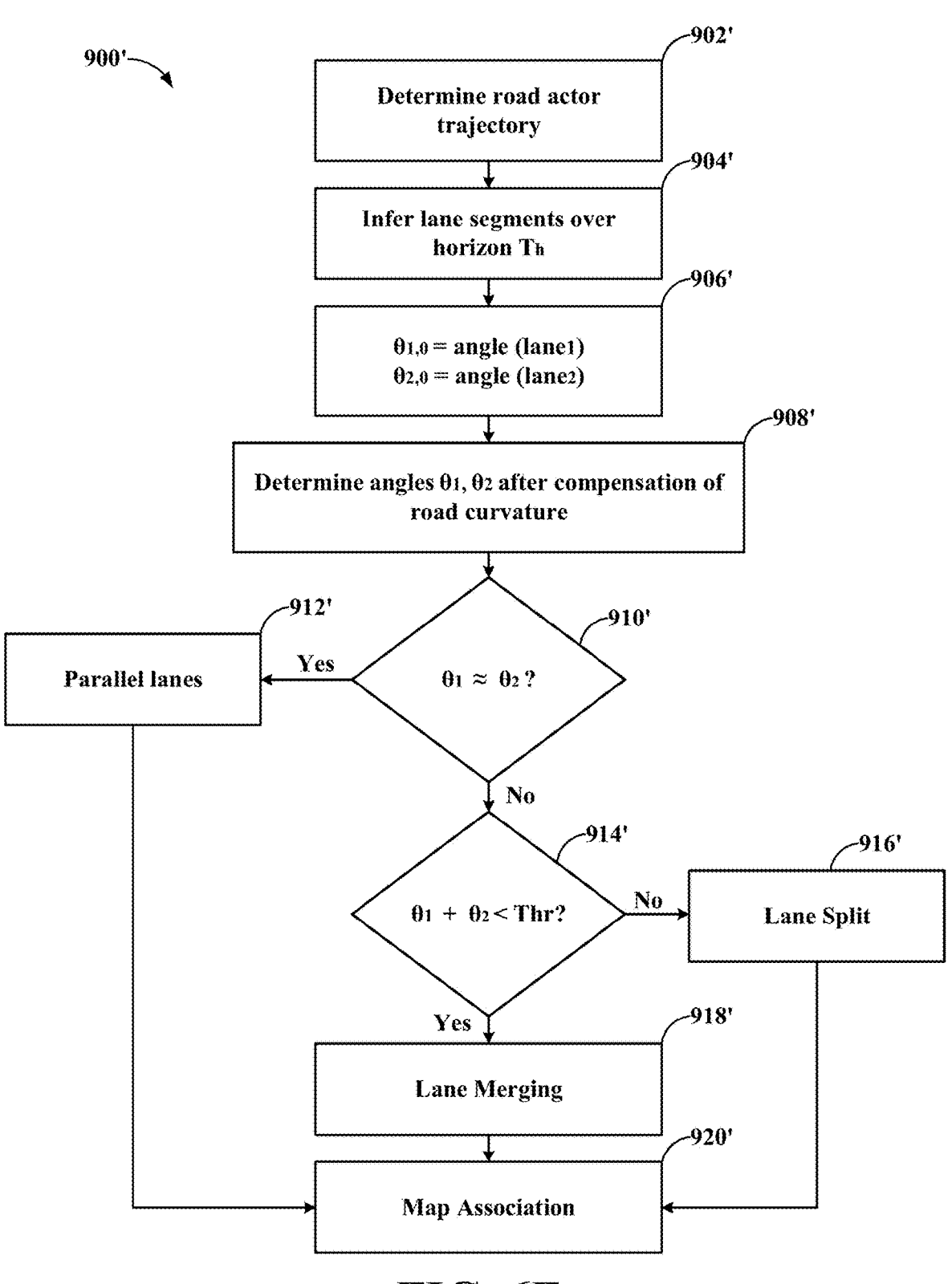
FIG. 6E is a flow diagram showing operations of the attribute detector of FIG. 6A according to another configuration.

According to another configuration, with reference to FIGS. 6C, 6D, 6E, a method 900' is provided for utilizing detected lanes to identify lane splits and merges. A parallel lane scenario is provided in FIG. 6C and a merging lane scenario is provide in FIG. 6D.

At 902', with reference to FIG. 6E, trajectories of a first road actor and a second road actor can be determined.

At 904', one or more lane segments can be inferred over a time horizon $T_h$.

At 906', a first angle $\theta_1$ and a second angle $\theta_2$ can be measured from a tangent to a midpoint of a lane.

At 908', the first angle $\theta_1$ and the second angle $\theta_2$ can be calculated to compensate for road curvature, if any. According to one aspect, a road skeleton can be used to represent actors in a local Frenet frame, for example.

At 910' if $\theta_1 \approx \theta_2$ then the method 900' proceeds to 912' and parallel lanes exist (FIG. 6C). If not, then the method 900' proceeds to 914'.

At 914', if $\theta_1 \approx \theta_2 <$Thr then the method 900' proceeds to 916' and a lane split exists. If not, then the method 900' proceeds to 918' and lane merging exists (FIG. 6D).

Following 912', 916', or 918', the method 900' can proceed to 920 where the geometric road attribute can be projected on a map.

Note, lane inference using road actor information may be avoided during certain road actor maneuvers. For instance, if an actor is performing a lane change, lane inference can be bypassed for that actor. However, information from other road actors that are not performing a lane change can still be used. According to one aspect, a high-risk threshold can be implemented which bypasses actor-based inference if another road actor surpasses the high-risk threshold, for example.

Figure 7:
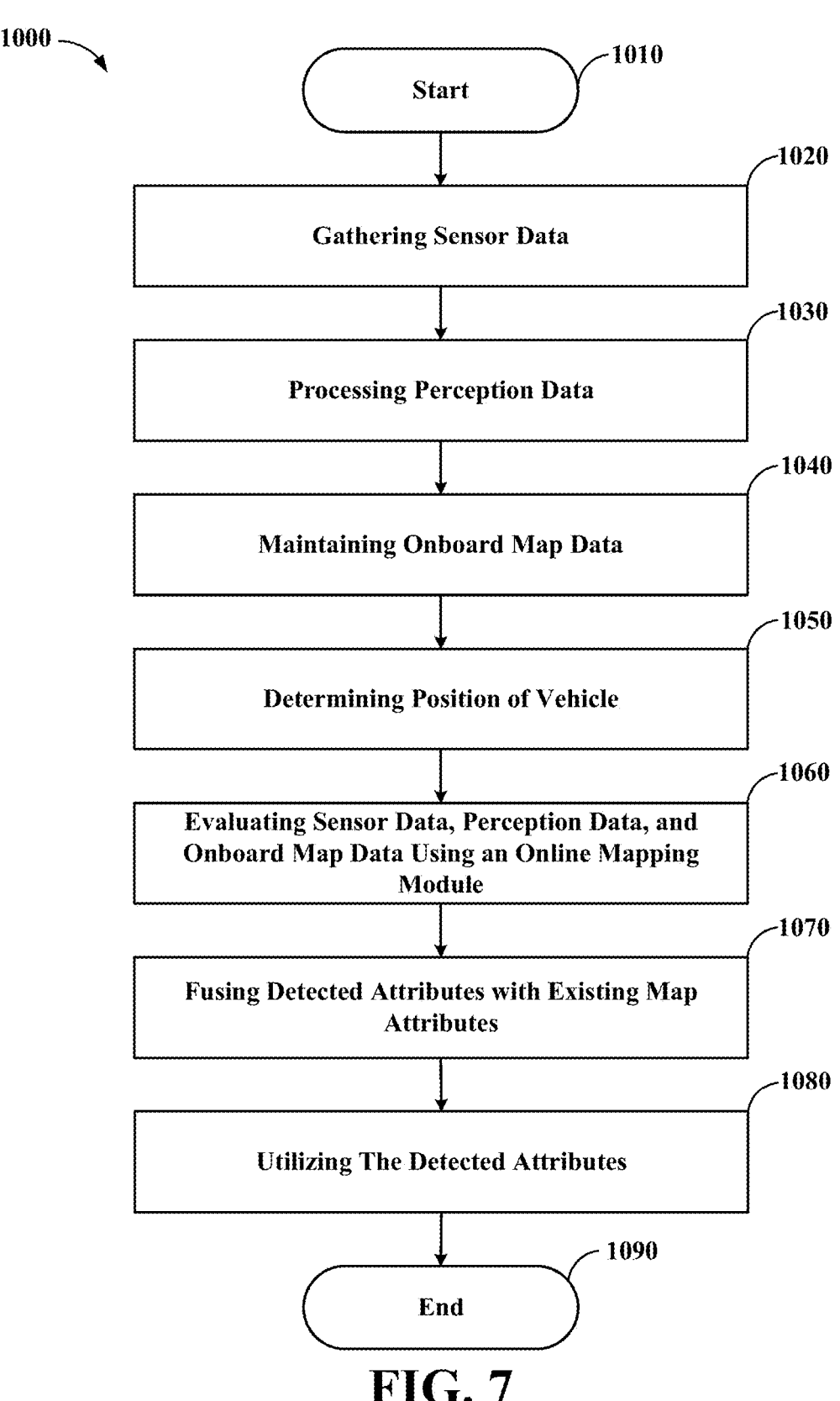
FIG. 7 is a flow diagram showing operations of the vehicle management system of FIG. 2.

With reference to FIG. 7, a method 1000 is provided for detecting road attributes that defined the shape of the road and/or map attributes that define expected behavior of road users.

At 1010, the method 1000 is initiated. In practical terms, the method 1000 is initiated when an operator starts the ignition of the host vehicle 100.

At 1020, sensor data 123 may be gather through the sensor system 120 of the host vehicle 100.

At 1030, perception data is processed using the perception system of the host vehicle 100.

At 1040, onboard map data 153 is maintained via the onboard map module 150.

At 1050, the position 124 of the vehicle 100 is continuously monitored.

At 1060, the sensor data 123, the perception data 143, and the onboard map data 153 is evaluated using the online map module 200, 200', 500.

At 1070, detected road and/or map attributes can be fused with existing road and/or map attributes.

At 1080, the detected road/or map attributes may be used to update the onboard map, determine quality of existing map data, and/or update a cloud database.

At 1090, the method 1000 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

gathering sensor data via a sensor system of a host vehicle that is an autonomous vehicle;

processing perception data via a perception system of the host vehicle;

maintaining onboard map data of the host vehicle;

determining a position of the host vehicle;

evaluating the sensor data, the perception data, and the onboard map data via an online mapping module comprising an actor-based reasoner module;

determining, via the actor-based reasoner module, one or more detected map attributes based on the perception data concerning behavior and trajectories of one or more road actors, the one or more detected map attributes including geometrical road attributes and semantic road attributes;

fusing the one or more detected map attributes with existing map attributes;

updating the onboard map data with the one or more detected map attributes;

controlling the host vehicle based on the updated onboard map data; and determining, via the actor-based reasoner module, inferred lane segments over a moving time window by: (i) evaluating the trajectories of the one or more road actors, (ii) computing left and right normalized perpendicular vectors with respect to a motion vector derived from the trajectories, (iii) projecting along the normalized perpendicular vectors to form the inferred lane segments, and (iv) connecting the inferred lane segments to previously inferred segments.

2. The method of claim 1, further comprising determining quality of the existing map attributes based on the one or more detected map attributes.

3. The method of claim 2, further comprising communicating the one or more detected map attributes to a cloud database for use by other vehicles.

4. The method of claim 1, wherein the online mapping module further comprises an online map generator module comprising a segmentizer configured to generate lane segments and a connectivity graph by detecting shared segments, a classifier configured to classify map elements in the connectivity graph, and a scene builder and publisher configured to fuse the one or more detected map attributes with the onboard map data and output a high-definition map for consumption by a planning module of the host vehicle.

5. The method of claim 1, wherein fusing the one or more detected map attributes with the existing map attributes further comprises providing high-definition map data configured for a planning module of the host vehicle.

6. The method of claim 1, wherein the actor-based reasoner module comprises a connectivity inference module configured to generate a connectivity sequence from a connectivity graph produced by a segmentizer module that evaluates the onboard map data and the position of the host vehicle.

7. The method of claim 1, further comprising detecting anomalies of the onboard map data by comparing the detected semantic road attributes with existing semantic attributes of a road and reporting the anomalies to a cloud system.

8. The method of claim 1, further comprising detecting anomalies of the onboard map data by comparing the detected geometric road attributes with existing geometric attributes of a road and reporting the anomalies to a cloud system.

9. The method of claim 1, further comprising cancelling, via the actor-based reasoner module, lane offset by performing actor-perception alignment when a distance between a closest perception point and an inferred edge point is less than or equal to a first threshold and performing actor-actor alignment when a distance between a closest aligned inferred point and the inferred edge point is less than or equal to a second threshold.

10. A system comprising:

data processing hardware; and memory hardware in communication with the data processing hardware, the memory hardware storing instructions that, when executed on the data processing hardware, cause the data processing hardware to perform operations comprising:

gathering sensor data via a sensor system of a host vehicle that is an autonomous vehicle;

processing perception data via a perception system of the host vehicle;

maintaining onboard map data of the host vehicle;

determining a position of the host vehicle;

evaluating the sensor data, the perception data, and the onboard map data via an online mapping module comprising an actor-based reasoner module;

determining, via the actor-based reasoner module, one or more detected map attributes based on the perception data concerning behavior and trajectories of one or more road actors, the one or more detected map attributes including geometrical road attributes and semantic road attributes;

fusing the one or more detected map attributes with existing map attributes;

updating the onboard map data with the one or more detected map attributes;

controlling the host vehicle based on the updated onboard map data; and determining, via the actor-based reasoner module, inferred lane segments over a moving time window by: (i) evaluating the trajectories of the one or more road actors, (ii) computing left and right normalized perpendicular vectors with respect to a motion vector derived from the trajectories, (iii) projecting along the normalized perpendicular vectors to form the inferred lane segments, and (iv) connecting the inferred lane segments to previously inferred segments.

11. The system of claim 10, further comprising determining quality of the existing map attributes based on the one or more detected map attributes.

12. The system of claim 11, further comprising communicating the one or more detected map attributes to a cloud database for use by other vehicles.

13. The system of claim 10, further comprising cancelling, via the actor-based reasoner module, lane offset by performing actor-perception alignment when a distance between a closest perception point and an inferred edge point is less than or equal to a first threshold and performing actor-actor alignment when a distance between a closest aligned inferred point and the inferred edge point is less than or equal to a second threshold.

14. A vehicle management system comprising:

a sensor system;

a perception system;

an onboard map module;

an online mapping module, comprising:

an actor-based reasoner module, and an online map generator module;

data processing hardware; and memory hardware in communication with the data processing hardware, the memory hardware storing instructions that, when executed on the data processing hardware, cause the data processing hardware to perform operations comprising:

gathering sensor data via the sensor system of a host vehicle that is an autonomous vehicle;

processing perception data via the perception system of the host vehicle;

maintaining, via the onboard map module, onboard map data of the host vehicle;

determining a position of the host vehicle;

evaluating the sensor data, the perception data, and the onboard map data via the online mapping module;

determining, via the actor-based reasoner module, one or more detected map attributes based on the perception data concerning behavior and trajectories of one or more road actors, the one or more detected map attributes including geometrical road attributes and semantic road attributes;

fusing, via the online map generator module, the one or more detected map attributes with existing map attributes;

updating the onboard map data with the one or more detected map attributes;

controlling the host vehicle based on the updated onboard map data; and determining, via the actor-based reasoner module, inferred lane segments over a moving time window by: (i) evaluating the trajectories of the one or more road actors, (ii) computing left and right normalized perpendicular vectors with respect to a motion vector derived from the trajectories, (iii) projecting along the normalized perpendicular vectors to form the inferred lane segments, and (iv) connecting the inferred lane segments to previously inferred segments.

15. The vehicle management system of claim 14, further comprising determining quality of the existing map attributes based on the one or more detected map attributes.

16. The vehicle management system of claim 15, further comprising communicating the one or more detected map attributes to a cloud database for use by other vehicles.

17. The vehicle management system of claim 14, further comprising cancelling, via the actor-based reasoner module, lane offset by performing actor-perception alignment when a distance between a closest perception point and an inferred edge point is less than or equal to a first threshold and performing actor-actor alignment when a distance between a closest aligned inferred point and the inferred edge point is less than or equal to a second threshold.

* * * * *